United States Patent
Bendaoud et al.

(10) Patent No.: US 9,638,246 B2
(45) Date of Patent: May 2, 2017

(54) ACTIVE MAGNETIC BEARING COILS ROLLED IN SERIES

(71) Applicants: Mohamed Bendaoud, Fontaine-Heudebourg (FR); Bernard Levent, Gaillon (FR)

(72) Inventors: Mohamed Bendaoud, Fontaine-Heudebourg (FR); Bernard Levent, Gaillon (FR)

(73) Assignee: SKF MAGNETIC MECHATRONICS, Rue des Champs, Saint-Marcel (FR)

( * ) Notice: Subject to any disclaimer, the term of this patent is extended or adjusted under 35 U.S.C. 154(b) by 167 days.

(21) Appl. No.: 14/731,489

(22) Filed: Jun. 5, 2015

(65) Prior Publication Data

US 2015/0354627 A1    Dec. 10, 2015

(30) Foreign Application Priority Data

Jun. 10, 2014   (EP) ..................................... 14305869

(51) Int. Cl.
*F16C 32/04*       (2006.01)

(52) U.S. Cl.
CPC ...... *F16C 32/0476* (2013.01); *F16C 32/0461* (2013.01); *F16C 32/0442* (2013.01); *F16C 2300/42* (2013.01)

(58) Field of Classification Search
CPC ... H02K 7/09; F16C 32/0461; F16C 32/0476; F16C 32/0442; F16C 2300/42
USPC .... 310/90.5, 90, 49.05, 49.07, 49.49, 49.22, 310/49.32, 156.32
See application file for complete search history.

(56) References Cited

U.S. PATENT DOCUMENTS

| | | | | |
|---|---|---|---|---|
| 5,302,874 A | * | 4/1994 | Pinkerton | F16C 32/044 310/90.5 |
| 6,288,465 B1 | * | 9/2001 | Suzuki | F16C 32/00 219/648 |
| 7,635,937 B2 | * | 12/2009 | Brunet | F16C 32/0459 310/90.5 |
| 2015/0345555 A1 | * | 12/2015 | Bigi | F16C 32/0476 310/88 |

FOREIGN PATENT DOCUMENTS

| | | |
|---|---|---|
| EP | 1808609 A1 | 7/2007 |
| FR | 2574880 A1 | 6/1986 |
| JP | H07139545 A | 5/1995 |

* cited by examiner

*Primary Examiner* — Naishadh Desai
(74) *Attorney, Agent, or Firm* — Bryan Peckjian; SKF USA Inc. Patent Dept.

(57) ABSTRACT

An axial magnetic bearing comprising a rotor stop disc which is mounted perpendicularly and integral with a rotating shaft and a coaxially stator assembly and comprising at least one stator element of magnetic material having an inner face parallel to a side of the rotor stop disc and separated from it by an air gap, the at least one stator element comprising two annular coils and housed in two annular notches formed continuously in the magnetic material of the at least one stator element and opening to the side of the rotor stop disc, the two annular notches being separated by an annular tooth, rolled in series and are formed by a single continuous wire, a bridging recess being cut in the annular tooth for receiving a massive insert part that extends the annular tooth without locally modifying the air gap with the rotor stop disc.

6 Claims, 1 Drawing Sheet

ACTIVE MAGNETIC BEARING COILS ROLLED IN SERIES

CROSS REFERENCE TO RELATED APPLICATIONS

This is a Non-Provisional Patent Application, filed under the Paris Convention, claims the benefit of European Patent (EP) Application Number 14305869.1 filed on 10 Jun. 2014 (10.06.2014), which is incorporated herein by reference in its entirety.

TECHNICAL FIELD

The present invention relates to magnetic bearings destined to be used in harsh environment such as oil and gas market and more particularly to an axial magnetic bearing having improved insulation performances.

PRIOR ART

Magnetic bearings are used in different rotating machines such as electric motors, compressor, turbines or the like in order to maintain the axial or/and radial positions of a rotating shaft by means of magnetic fields acting on a rotor of the machine.

One of the weak points of the axial magnetic bearing is the insulation level needed to get a safe operation. Indeed, the inventors have noted that most of bearing failures due to insulation level too low are caused by the failure of interconnection between coils even if all interconnection are currently realized in a way to reach a highest insulation level.

A known solution to increase the insulation performances of such axial magnetic bearings is to substitute classical insulation of the coil (enameled wires) by improved insulation with high performance material that can be recover after water immersion and drying such as Teflon®. However, the manufacturing of such axial magnetic bearings becomes then very expensive.

SUMMARY OF THE INVENTION

The present invention aims to eliminate the above disadvantages. And instead of trying to increase the insulation level, the invention is to suppress all the interconnection by rolling axial magnetic bearing coils in series.

For this, the axial magnetic bearing according to the invention is of the type comprising a rotor stop disc which is mounted perpendicularly and integral with a rotating shaft and a stator assembly coaxial with a longitudinal axis of the rotating shaft and comprising at least one stator element of magnetic material having an inner face parallel to a side of the rotor stop disc and separated from it by an air gap, the at least one stator element comprising two annular coils coaxial with the longitudinal axis and housed in two annular notches formed continuously in the magnetic material of the at least one stator element and opening to the side of the rotor stop disc, the two annular notches being separated by an annular tooth, the axial magnetic bearing being characterized in that the two annular coils of each stator element are rolled in series and are formed by a single continuous wire, a bridging recess being cut in the annular tooth for receiving a massive insert part that extends the annular tooth without locally modifying the air gap with the rotor stop disc.

The rolling in series of the coils suppresses the usual interconnection between coils and consequently impacts on the manufacturing process at least by a cost and time saving. That further improves the insulation performances (behavior) of the axial magnetic bearing and guaranties interchangeability with existing magnetic bearings.

According to another feature of the invention, it comprises two stator elements facing each side of the rotor stop disc, the two annular notches of one of the two stator elements having circumferences respectively equal to that of the two annular notches of the other of the two stator elements.

Preferably, the bridging recess comprises a groove linking the two annular notches for receiving the single continuous wire.

According to yet another feature of the invention, the massive insert part is maintained in position by centering pins fixed by screws in the stator element.

Advantageously, it further comprises an inlet hole crossing the stator element and ending in one of the two annular notches for entering the single continuous wire and an outlet holes crossing the stator element and ending in the other one of the two annular notches for exiting the single continuous wire.

Preferably, it further comprises a plate fixed by screws in the stator element in order to cover the inlet and outlet holes and output two terminal ends of the single continuous wire.

BRIEF DESCRIPTION OF THE DRAWINGS

The invention will be better understood and further details and advantages thereof will appear more clearly in the following description with reference to the accompanying drawings illustrating embodiments of the invention, and in which.

DETAILED DESCRIPTION

Figure 2:
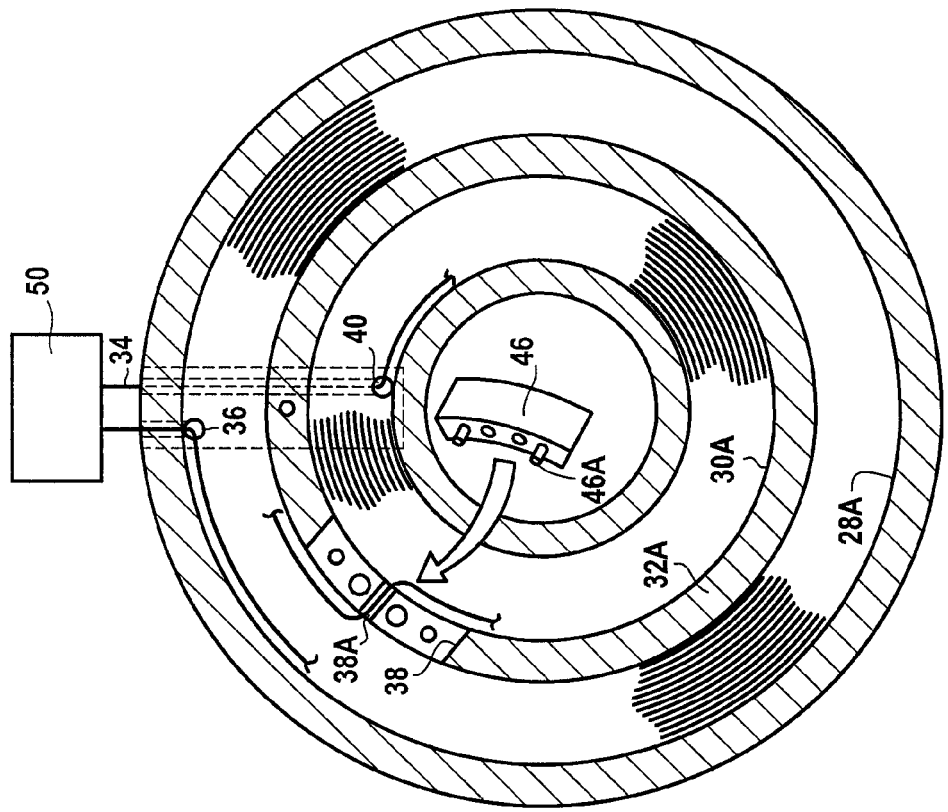
FIG. 2 is a section of a stator element of the bearing of FIG. 1.
Figure 1:
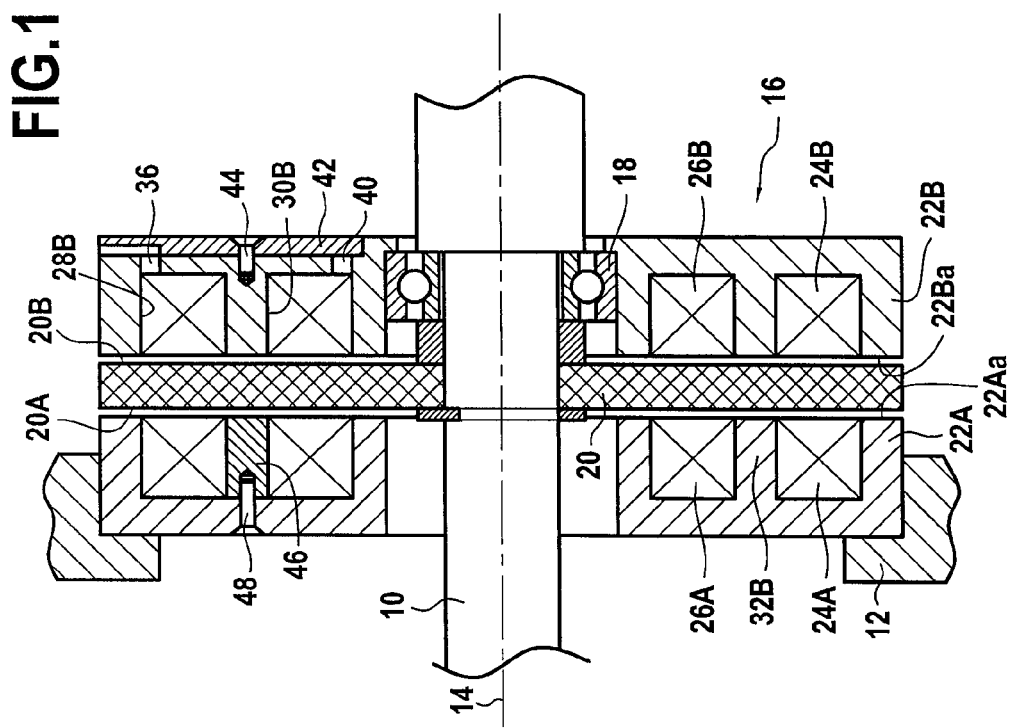
FIG. 1 shows an axial magnetic bearing according to the invention.

Referring to the embodiment of FIGS. 1 and 2, a rotating shaft 10 of a rotating machine is held in position in a structure 12 along its longitudinal axis 14 by an axial magnetic bearing (thrust bearing 16) of the invention. For supporting the rotating shaft essentially during a starting or stopping operation of the rotating machine, but also in the event of a failure or insufficient normal operation, a landing mechanical bearing 18, also known as emergency or touch down bearing, is also illustrated.

The axial magnetic bearing comprises a rotor stop disc 20 which is mounted perpendicularly and integral with the rotating shaft 10 and a stator assembly 22 secured to the structure and consisting of two stator elements 22A and 22B made of a magnetic material (iron alloy such as XC12 for example) and coaxially surrounding the rotating shaft 10, each of the stator elements being mounted perpendicularly to the longitudinal axis 14 on each side 20A, 20B of the rotor stop disc 20.

More particularly, the stator element 22A has an inner face 22Aa parallel to an inner face 22Ba of the stator element 22B and separated from it, along the longitudinal axis 14 of the rotating shaft 10, to define therebetween a space in which is housed the rotor stop disc 20 and consequently also to define respective air gaps between the inner face of each of the stator elements 22A, 22B and each side 20A, 20B of the rotor stop disc 20.

A detector (not illustrated) is generally associated with this axial magnetic bearing to detect the position of the rotor stop disc 20 relative to the stator 22 and delivers a signal to a controller 50 that powers the coils in order to create a magnetic field such that the active surfaces 22Aa, 22Ba of the stator can exert a force of attraction on the rotor stop disc 20 as to maintain it in an axial position that is stable.

The stator element 22A (and respectively 22B) having an E-shape configuration comprises two annular coils 24A and 26A (24B, 26B) coaxial with the longitudinal axis 14 and housed respectively in two annular notches 28A and 30A (28B, 30B) concentric and formed continuously in the magnetic material of a solid magnetic block forming the stator element 22A.

The two annular notches 28A and 30A (28B, 30B) open towards the corresponding face 20A (20B) of the rotor stop disc 20 so that the two annular coils 24A and 26A (24B, 26B) are close to the air gap between the inner face of the stator element 22Aa (22Ba) and the corresponding face 20A (20B) of the rotor stop disc 20.

The respective radii of the two annular notches 28B and 30B starting from the longitudinal axis of the rotating shaft 10 are respectively identical to the respective radii of the annular notches 28A and 30A from the longitudinal axis 14. This implies that the coils 24A and 24B are facing one another as well as the coils 26A and 26B with an annular tooth 32A extending between the two annular notches 28A and 30A, also with another annular tooth 32B extending between the other two annular notches 28B and 30B.

According to the invention, the two annular coils 24A, 26A; 24A, 26B of each stator element 22A, 22B (for a better understanding only stator element 22A is illustrated in FIG. 2) of the axial magnetic bearing are rolled in series and are formed by a single continuous wire 34 that enters in one (for example 28A) of the two annular notches by an inlet hole 36 crossing the stator element and ending in the one annular notch, rolls up the required number of turns in the one annular notch, crosses the annular tooth 32A at a bridging recess 38 for joining the other one 30A of the two annular notches, again rolls up the required number of turns in the other one annular notch and exits from the other one annular notch through an outlet hole 40 crossing the stator element and ending in the other one annular notch. A plate 42 fixed for example by screws 44 in the stator element covers the inlet and outlet holes and outputs two terminal ends of the single continuous the wire 34 to direct them to the controller 50.

In order to avoid any modification of the Eddy current in the stator element, a solid or massive insert part 46 is cut in the annular tooth and exactly inserted in the bridging recess 38 with an external surface that extends the annular tooth 32A, 32B without exceeding its periphery so as to avoid any local modification in the air gap, i.e. to maintain the air gap with the rotor stop disc 20 constant on all points of the annular tooth reconstituted like that. To avoid any flattening of the single continuous wire 34 by the massive insert part 46, a groove 38A linking both annular notches is preferably provided in the recess 38 for receiving this wire. Furthermore, to warranty a perfect alignment of the massive insert part with the annular notches, this massive insert part that is during operation magnetically and mechanically strongly stressed, is maintained in position by centering pins 46A and fixed by at least two screws 48 in the stator element.

The axial magnetic bearing operates classically as follows. When a current flows through the annular coil(s) it creates a low frequency (usually <1000 Hz) magnetic field in the air gap(s) tending to maintain the desired axial position of the rotor stop disc 20. Whenever the rotor stop disc deviates from this desired axial position, it is controlled appropriately and by techniques known in order to modify the magnetic field to bring the rotor stop disc into position.

The invention is particularly suitable for axial magnetic bearings of important machines like chiller, turbo-compressor or turbo-expander for example as for axial magnetic bearings within smaller systems like HVAC for cars or trucks or also permanent magnets motors and generators.

Although preferred embodiments have been shown and described, it should be noted that any changes and modifications may be made therein without departing from the scope of the invention as defined in the appended claims.

The invention claimed is:

1. An axial magnetic bearing comprising:
   a rotating shaft;
   a rotor stop disc mounted perpendicularly and integral with the rotating shaft;
   a stator assembly coaxial with a longitudinal axis of the rotating shaft, wherein the stator assembly includes at least one stator element of magnetic material having an inner face parallel to a side of the rotor stop disc and separated from the side of the rotor stop disc by an air gap,
   wherein the at least one stator element includes two annular coils arranged coaxially with the longitudinal axis of the rotating shaft and housed in two annular notches formed continuously in the magnetic material of the at least one stator element and opening to the side of the rotor stop disc,
   the two annular notches being separated by an annular tooth,
   wherein the two annular coils of each stator element are rolled in series and are formed by a single continuous wire, and
   a bridging recess being cut in the annular tooth for receiving a massive insert part that extends the annular tooth without locally modifying the air gap with the rotor stop disc.

2. The axial magnetic bearing of claim 1, further comprising two stator elements facing each side of the rotor stop disc,
   wherein the two annular notches of one of the two stator elements having circumferences respectively equal to that of the two annular notches of the other of the two stator elements.

3. The axial magnetic bearing of claim 1, the bridging recess further comprising a groove linking the two annular notches for receiving the single continuous wire.

4. The axial magnetic bearing of claim 1, wherein the massive insert part is maintained in position by centering pins fixed by at least two screws in the stator element.

5. The axial magnetic bearing of claim 1, further comprising an inlet hole crossing the stator element and ending in one of the two annular notches for entering the single continuous wire and an outlet holes crossing the stator element and ending in the other one of the two annular notches for exiting the single continuous wire.

6. The axial magnetic bearing of claim 1, further comprising a plate fixed by screws in the stator element in order to cover the inlet and outlet holes and output two terminal ends of the single continuous wire.

* * * * *